United States Patent [19]

King

[11] Patent Number: 4,630,737
[45] Date of Patent: Dec. 23, 1986

[54] SPACER CLIP

[75] Inventor: Ronald R. King, Sutton, Mass.

[73] Assignee: Wright Line, Inc., Worcester, Mass.

[21] Appl. No.: 839,698

[22] Filed: Mar. 13, 1986

[51] Int. Cl.⁴ ............................................. A47G 29/00
[52] U.S. Cl. ........................................ 211/40; 312/13
[58] Field of Search .................... 312/13, 14, 15, 16, 312/17; 206/387; 211/40

[56] References Cited

U.S. PATENT DOCUMENTS

| | | | |
|---|---|---|---|
| 1,117,118 | 11/1914 | Weis | 312/13 |
| 3,391,792 | 7/1968 | Makar | 211/40 |
| 3,613,895 | 10/1971 | Larkin | 211/40 |
| 4,087,138 | 5/1978 | McRae | 312/15 |
| 4,330,162 | 5/1982 | Aboussouan | 312/15 |

Primary Examiner—Carl D. Friedman
Attorney, Agent, or Firm—Hamilton, Brook, Smith & Reynolds

[57] ABSTRACT

A cell for storing and dispensing a cartridge comprising a rear wall, a vertical side wall, and a cartridge engaging bottom. A front cartridge-discharge end is located opposite the rear wall and there are means to pivot the cell relative to the horizontal. A spacer clip is removably attached to the rear wall of the cell and has a member projecting toward the discharge end of the cell. The spacer clip is engageable with the rear end of the cartridge when the cartridge is positioned on the bottom of the cell with its front end adjacent the front cartridge-discharge end of the cell.

10 Claims, 13 Drawing Figures

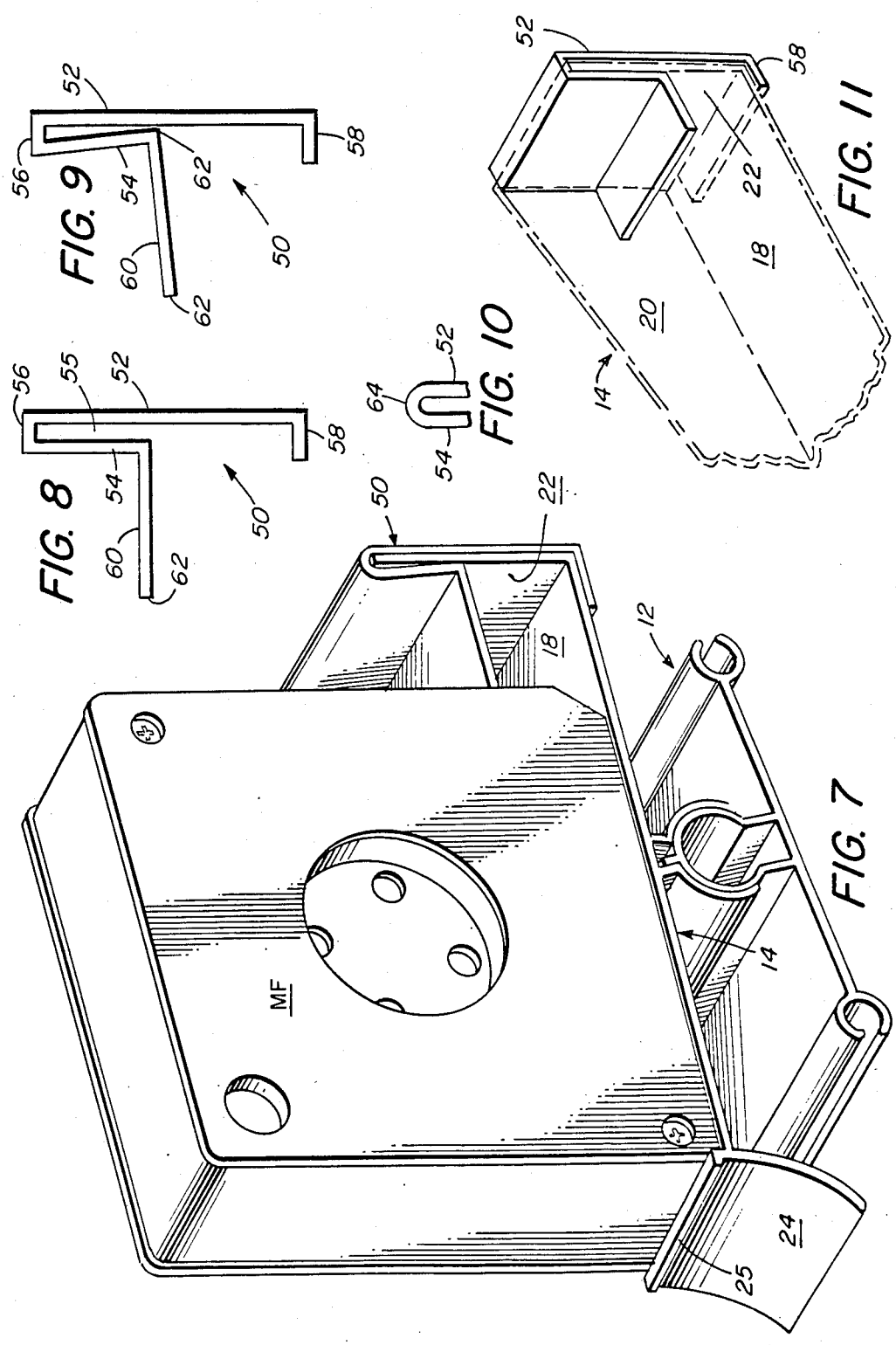

SPACER CLIP

DESCRIPTION

1. Field of the Invention

This invention relates to storing and dispensing systems in general and more specifically to a system for storing and dispensing tape cartridges.

2. Background of the Invention

For years the accepted state-of-the-art means for supplying digital magnetic tape to data processors and other users was the familiar 10½ inch reel of ferric oxide magnetic tape. The development of the IBM 3480 Magnetic Tape Subsystem which utilizes a recording medium of chromium-dioxide magnetic particles on tape contained within compact, easy to handle cartridges, is rapidly making the 10½ inch tape reels obsolete. Not only is the chromium-dioxide magnetic tape technologically better than ferric oxide tape, but being stored in specially designed cartridges which are about 4 inches by 5 inches in size compared with the 10½ inch reels has results in substantial space saving to users.

Libraries for tape cartridges are available in the form of conventional stationary pigeon hole stacks into which individual cartridges are slid and then removed for usage. Portable carts with pigeon holes are also available to transport a number of cartridges from the stacks to the data processing equipment.

In my copending patent application Ser. No. 729,364 filed May 1, 1985, for "System For Storing And Dispensing Magnetic Tape Cartridges[, I have disclosed a system for storing and dispensing a magnetic tape cartridge including a pivotal storage cell which has a cartridge-discharge end and a cartridge abutting end. A support is located beneath the cell and pivot means are located intermediate the ends of the cell to permit the cell to pivot on the support means relative to the horizontal. A number of cells are located side by side on the support means. The cells and the cartridges they contain are aligned relative to each other and when one wishes to remove a cartridge from the cell, the cell is pivoted on the support means to make a corner of the cartridge readily grippable for removal.

The system has proven to be successful for cartridges for use in the IBM 3480 Magnetic Tape Subsystem.

Microfilm cartridges are generally of a similar shape to the tape cartridges for which the system was designed. However, they are sufficiently smaller so that they would shift back and forth if placed in a cell designed for the larger cartridges.

It is accordingly an object of this invention to provide means for adapting the cell to accommodate smaller sized cartridges so that the cartridges will not shift back and forth when the cell is pivoted.

SUMMARY OF THE INVENTION

In accordance with the object, the invention resides in means for adapting a cell to accommodate smaller sized cartridges so that they will not shift back and forth when the cell is pivoted. The cell has a rear wall, a vertical side wall, and a cartridge engaging bottom. There is a front, cartridge-discharge end opposite the rear wall and means to pivot the cell relative to the horizontal. A spacer clip is removably attached to the rear wall of the cell. The clip has a member projecting forward or toward the discharge end of the cell to engage the rear end of the cartridge when the cartridge is positioned on the bottom of the cell with its front end adjacent the front cartridge-discharge end. The length of the projecting member is substantially equal to the difference between the length of the cartridge and the length of the interior of the cell.

The spacer clip has an upstanding back member and a front member spaced from and substantially parallel to the back member. A bridge joins the upper ends of the front and back members. The cartridge engaging member projects from the lower end of the front member of the clip in a direction away from the back member. A foot is positioned on the lower end of the back member and projects substantially parallel to the cartridge engaging member in the same direction as the cartridge engaging member.

The clip is assembled to the cell with the front and back members on opposite sides of the rear wall of the cell and with the foot engaged beneath the bottom of the cell.

The bridge joining the front and rear members may be either flat or arcuate.

In its unassembled form, the lower end of the front member is closer to the back member than is its upper end so that when it is assembled on the back wall, the natural spring resiliency of the clip, which is made of high impact extruded plastic, holds it firmly in position.

The above and other features of the invention including various novel details of construction and combinations of parts will now be more particularly described with reference to the accompanying drawings and pointed out in the claims. It will be understood that the particular system for storing and dispensing a magnetic tape cartridge is shown by way of illustration only and not as a limitation of the invention. The principles and features of this invention may be employed in varied and numerous embodiments without departing from the scope of the invention.

BRIEF DESCRIPTION OF THE DRAWINGS

FIG. 7 is a perspective view of a microfilm cartridge in a cell employing a filler clip made in accordance with this invention.

FIG. 8 is an end view of the filler clip and

FIG. 9 is an end view of the filler clip in its post-cooling configuration.

FIG. 10 is an end view of an alternative configuration of the filler clip.

FIG. 11 is a perspective view of a cell and filler clip partially in phantom and with parts partially broken.

BEST MODE OF CARRYING OUT THE INVENTION

Figure 1:
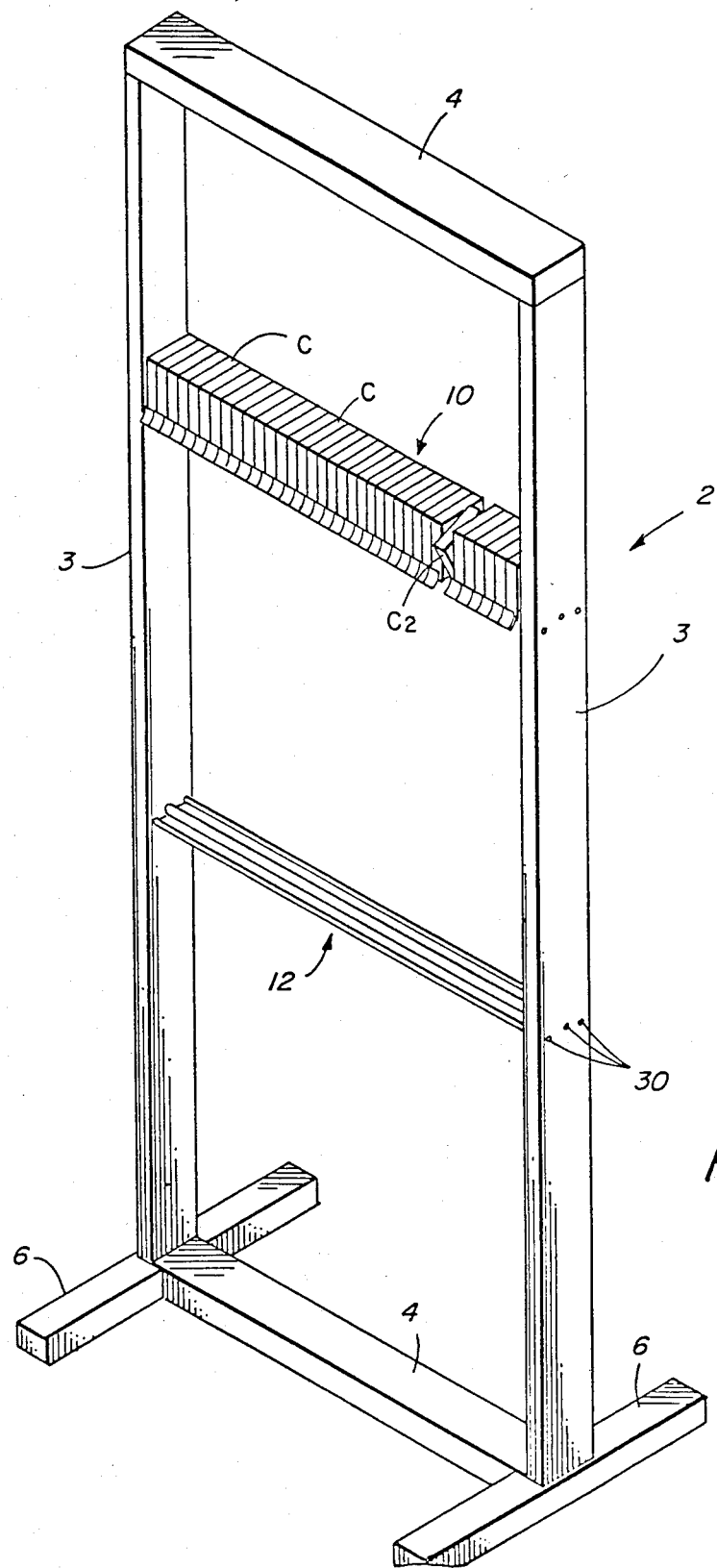
FIG. 1 is a perspective view of a library stack for storing and dispensing magnetic tape cartridges in accordance with the invention.

In FIG. 1 there will be seen a portion of a library stack in the form of a frame 2 comprising upright members 3, horizontal members 4, and supporting feet 6. It will be appreciated that the frame 2 is illustrative of not only a portion of a library stack but also a free-standing member or even the frame portions of a mobile cart which is employed for transporting cartridges C from a library to data processing equipment which will utilize the cartridges.

Cartridges are stored side-by-side in horizontal rows 10, only one of which is shown in FIG. 1. Cartridges C are pivotal relative to the horizontal on support means 12 (only one of which is shown in FIG. 1). It will be understood that there are a plurality of horizontal rows 10 of support means 12 mounted within the frame 2.

Figure 2:
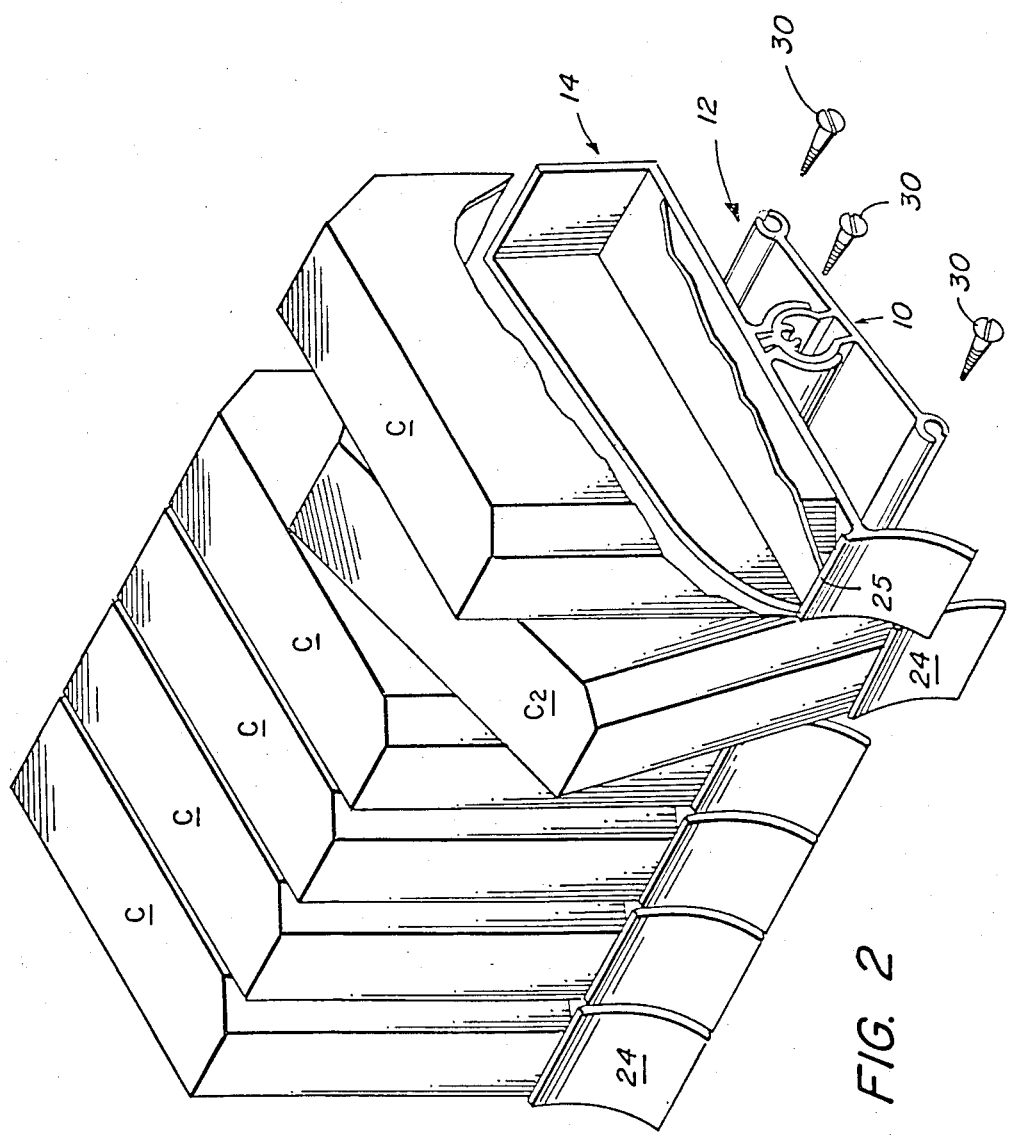
FIG. 2 is a perspective view of a partial row of magnetic tape cartridges in cells on their support means.

As seen in FIG. 2, each cartridge C is contained within a cell 14, the end most cartridge being broken away to expose the cell. The cell 14 is pivotal relative to the horizontal on the support means 12, by cooperative pivot means 16 (FIG. 4) which will be described in greater detail hereinafter. One cartridge $C_2$ is in the discharge or dispensing position, its cell being tilted downwardly on the support 12 where the upper exposed corner of the cartridge $c_2$ may be conveniently gripped and removed from the cell. The remaining cartridges C are shown in their normal or cartridge storing position. When each cell is in its storing position, the cartridge abuts the rear wall of the cell and when the cell is tilted to the discharge position, the cell slides forwardly slightly, shifting the center of gravity of the combined cell and cartridge forward until the cartridge abuts the retaining means at the discharge end as will be described in more detail hereinafter. The cell and its cartridge remain in this position until the cartridge is removed. Thereafter, the empty cell tilts rearwardly due to the location of its center of gravity.

Figure 3:
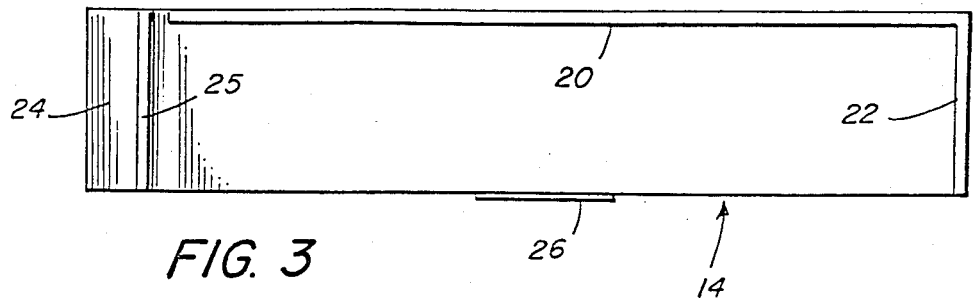
FIGS. 3 through 6 are top, side, front, and back views, respectively, of one embodiment of a cartridge storing cell made in accordance with the invention.
Figure 4:
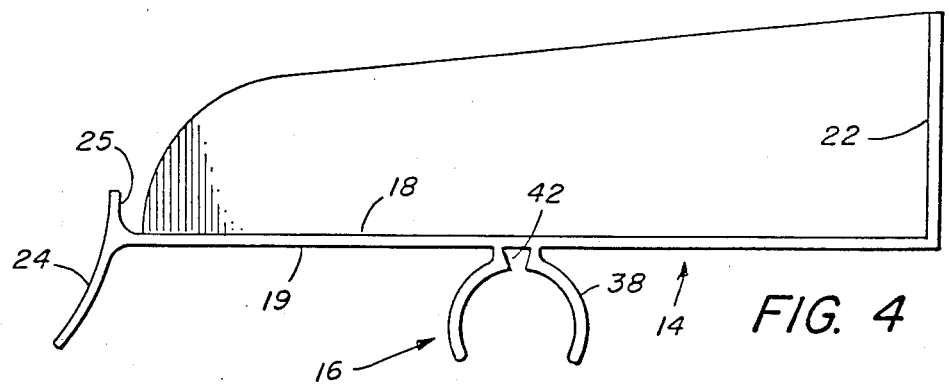

One embodiment of an illustrative cartridge storing and dispensing cell 14 is shown in FIGS. 3 through 6. The cell 14 which may be made of high impact styrene, or the like, has a flat cartridge engaging bottom 18, a bottom surface 19, a vertical side wall 20, a rear wall 22, which will be seen at the righthand side as seen in FIGS. 3 and 4 and which is also known as the rear or cartridge abutting end of the cell. The lefthand end of the cell 14 as viewed in these figures, is known as the cartridge-discharge end.

Located at the cartridge-discharge end of the cell is an arcuate member 24 which may be pressed by a finger to tilt the cell from its normal cartridge storing position, in which the cartridge-abutting end of the cell is tilted downwardly lower than the horizontal to the cartridge discharge position where the discharge end is lower than the horizontal. The pressure accepting means 24 may accept means on its surface such as a label or decal for identifying the cartridge stored within the cell.

The cell includes a rib or wall 25 extending upwardly from the bottom 18 across its front or cartridge-discharge end. This serves as a cartridge restraining means to prevent the cartridge C from sliding out of the cell when the cell is tilted to the discharge position.

Figure 5:
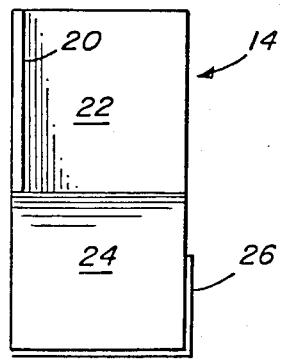
Figure 6:
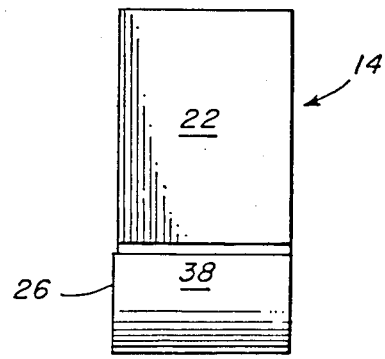

The pivot means 16, which is located beneath the cell is shown extending from one side of the cell to the other. It projects slightly forming a projection 26 on side as seen in FIGS. 5 and 6. In the assembled relationship, the hub 26 engages the pivot means of the next adjacent cell and acts as a lateral bearing to maintain a slight vertical spacing between the side wall 20 of one cell and the cartridge C held within the next adjacent cell.

Whereas FIG. 2 illustrates a magnetic tape cartridge C occupying virtually all of the cell 14, FIG. 7 illustrates a microfilm cartridge MF in a cell. A microfilm cartridge is of smaller size and shape than a magnetic tape cartridge and would shift back and forth if placed in a cell designed for the larger cartridge. To assure that this does not happen, a filler clip 50 is placed on the rear wall 22 of the cell 14.

As will be seen in FIG. 8, the filler clip 50 comprises a first upstanding back member 52. It is slightly longer than the rear wall 22 of the cell 14. Parallel to and spaced from the back member 52 is a downwardly extending front member 54 which is joined to the back member 52 by a bridge 56 at their upper ends. The space 55 between the members 52 and 54 is slightly larger than the thickness of the rear wall 22 of the cell. At the bottom of the back member 52 is a foot 58 projecting forwardly from the lower end of the member 52. A horizontally extending projection 60, terminating in a front edge 62, extends from the bottom of the member 54. This is the cartridge engaging member. The length of the member 60 is variable and is selected to accommodate the space between the rear of the microfilm cartridge MF and the rear wall 22 of the cell 14 when the cartridge is in the position shown in FIG. 7 with the edge 62 of the clip in engagement with the cartridge MF and front face of the cartridge in close proximity to the rib or wall 25 at the front end of the cartridge 14. Thus, the length of the projecting member 60 being substantially equal to the difference between the length of the cartridge and the length of the interior of the cell.

The filler clip 50 is formed from a length of extruded plastic, such as high impact styrene. Each clip is cut from the extrusion and has a length corresponding to the length of the rear wall 22 of the cartridge. As seen in FIG. 9, the lower end 62 of the member 54 is closer to the member 52 than the upper end. This is the configuration of the clip after the plastic has cooled. This is the nonassembled configuration of the clip as distinguished from the FIG. 8 configuration which the clip assumes when it is assembled to the rear wall 22 of the cell. The purpose is to assure that the clip will fit snugly on the cell through the spring action of the plastic.

The filler clip is assembled on the rear wall of the cell by sliding it from the open end of the cell until the clip abuts the vertical wall 20 as shown in FIG. 11. The foot 58 underlies the cartridge and the bridge 56 is located over the top edge of the rear wall 22 of the cell.

When assembled on the cell as shown in FIG. 7, the microfilm cartridge MF is close to or abuts the front wall 25 as well as the edge 62 of the filler clip thereby being prevented from any substantial sliding motion back and forth on the bottom 18 of the cell 14 when the cell is pivoted.

As seen in FIG. 10, the bridge which joins the members 52 and 54 need not be flat as shown a 56 in FIG. 8 but rather may be of arcuate configuration as shown in 64.

Figure 12:
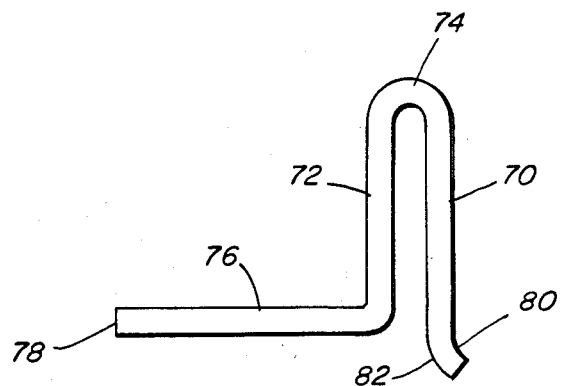
FIG. 12 is an end view of an alternative embodiment of the filler clip.
Figure 13:
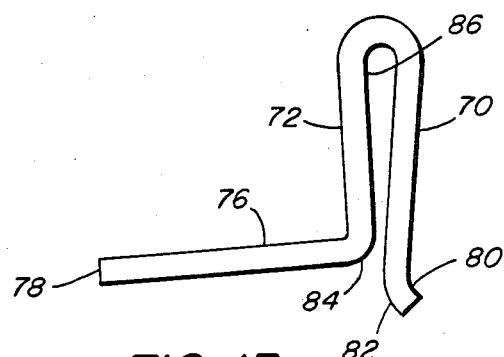
FIG. 13 is an end view of the filler clip of FIG. 12 in its post-cooling configuration.

FIGS. 12 and 13 show an alternative embodiment of the filler clip. Whereas the filler clip of FIG. 8 is slid laterally onto the rear wall 22 of a cell, when there are a number of cells aligned side by side on their supporting means 12 in the manner shown in FIG. 1, each cell would have to be removed from the supporting means in order to attach a filler clip of the FIG. 8 configuration. The FIG. 12 embodiment is a clip which may be attached to the rear wall 22 of the cell 14 by sliding it downwardly over the rear wall. The spacer clip includes an upstanding back member 70 and a front member 72 spaced from and substantially parallel to the back member. They are joined by an arcuate bridge 74. A cartridge engaging member 76 projects from the lower end of the front member 72 in a direction away from the back member 70 and terminates in a front edge 78 which is engageable with the rear of a microfilm cartridge MF in the cell.

The rearward end 80 of the back member 70 curves downwardly and away from the front wall 72 and has an arcuate surface 82 to facilitate the clip being slid over the back wall 22 of the cell 14.

FIG. 13 shows the filler clip in its post cooling configuration which, like the FIG. 8 clip, is prestressed to the shape shown to provide a firm grip on the rear wall 22 of the cell. It will be noted that the lower end 84 of the front member 72 is closer to the back member 70 than the upper end 86 and the gap between the lower end of the front member 72 and the rear member 70 is somewhat less than the thickness of the rear wall of the cell over which the filler clip is placed.

I claim:

1. A cell for storing and dispensing a cartridge comprising:
    a rear wall,
    a vertical side wall,
    a cartridge engaging bottom,
    a front cartridge discharge end opposite the rear wall,
    means to pivot the cell relative to the horizontal, and
    a spacer clip removably attached to the rear wall of the cell and having a member projecting toward the discharge end of the cell, the spacer clip being engageable with the rear end of a cartridge when the cartridge is positioned on the bottom of the cell with its front end adjacent the front cartridge discharge end of the cell.

2. A cell for storing and dispensing a cartridge comprising:
    a rear wall,
    a vertical side wall,
    a cartridge engaging bottom,
    a front cartridge discharge end opposite the rear wall,
    means to pivot the cell relative to the horizontal, and
    a spacer clip removably attached to the rear wall of the cell, the clip being slidable over the rear wall and having a member projecting toward the discharge end of the cell, the length of the projecting member being substantially equal to the difference between the length of the cartridge and the length of the interior of the cell.

3. A spacer clip attached to a cell for storing and dispensing cartridges, the clip comprising:
    an upstanding back member,
    a front member spaced from and substantially parallel to the back member,
    a bridge joining the upper ends of the front and back members,
    a removable cartridge engaging member projecting from the lower end of the front member in a direction away from the back member.

4. A spacer clip in accordance with claim 3 wherein the bridge is flat.

5. A spacer member in accordance with claim 3 wherein the bridge is arcuate.

6. A spacer member according to claim 3 wherein the lower end of the front member is closer to the back member than the upper end.

7. A spacer member according to claim 3 wherein the front member is shorter than the back member.

8. A spacer member according to claim 3 wherein a foot projects from the lower end of the back member substantially parallel to the cartridge engaging member and in the same direction as the cartridge engaging member.

9. A spacer member according to claim 3 wherein an arcuate member projects from the lower end of the back member in a direction away from the front member.

10. A spacer member according to claim 3 wherein the clip is made of extruded resilient plastic.

* * * * *